United States Patent

[11] 3,571,559

| [72] | Inventors | Josef Becker<br>Spich;<br>Michael Wienand, Siegburg, Germany |
|---|---|---|
| [21] | Appl. No. | 786,081 |
| [22] | Filed | Dec. 23, 1968 |
| [45] | Patented | Mar. 23, 1971 |
| [73] | Assignee | Dynamit Nobel Aktiengesellschaft<br>Troisdorf, Germany |
| [32] | Priority | Dec. 22, 1967 |
| [33] | | Germany |
| [31] | | P 17 04 012.9 |

[54] APPARATUS FOR WELDING THERMOPLASTIC SYNTHETIC FOAM BLOCKS
15 Claims, 8 Drawing Figs.

[52] U.S. Cl. ................................................ 219/243, 219/521
[51] Int. Cl. ................................................ H05b 1/00
[50] Field of Search ........................................ 219/200, 243, 481, 520, 521, 523, 535; 156/499

[56] References Cited
UNITED STATES PATENTS

| 2,084,625 | 6/1937 | Stebbins et al. | 156/499X |
| 3,016,085 | 1/1962 | Gassner | 156/499X |
| 3,400,245 | 9/1968 | Burgess | 219/245 |
| 2,387,566 | 10/1945 | Custers | 156/499 |

Primary Examiner—J. V. Truhe
Assistant Examiner—C. L. Albritton
Attorney—Craig, Antonelli, Stewart & Hill ABSTRACT: Apparatus for welding blocks or other molded forms of synthetic foam materials, such as, for example, thermoplastic polymers, including a welding device incorporating wedge-shaped separating means disposed in advance of a heating wire for traversing the desired location of the seam, whereby the heating wire is able to pass through the location of the seam substantially unobstructed by forces of friction and the like between the wire and the surfaces of the forms to be welded.

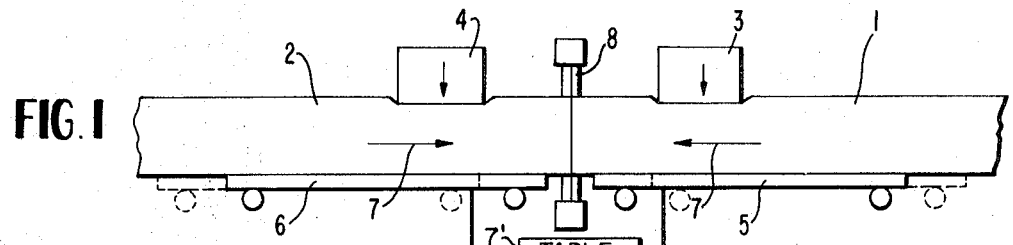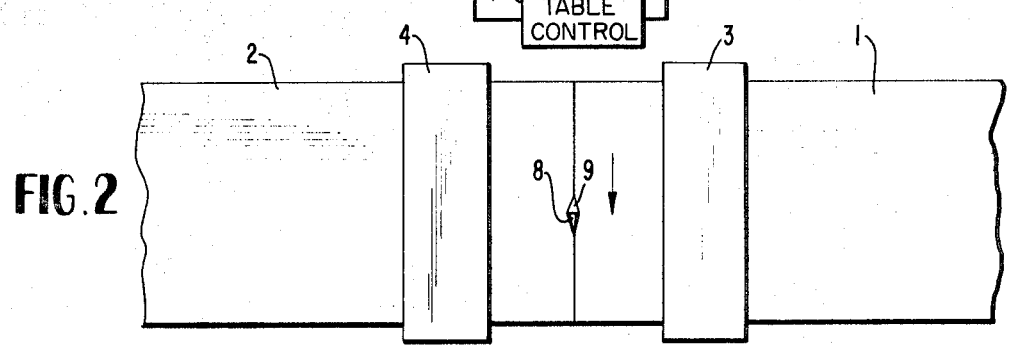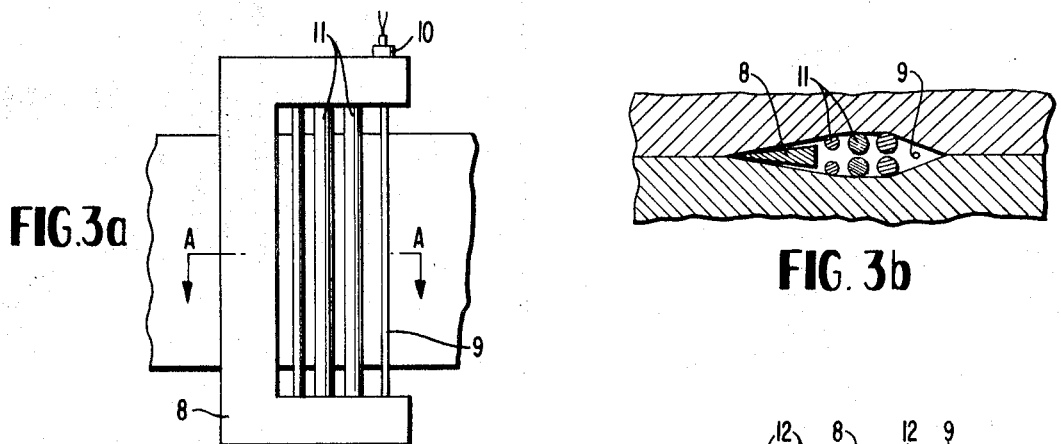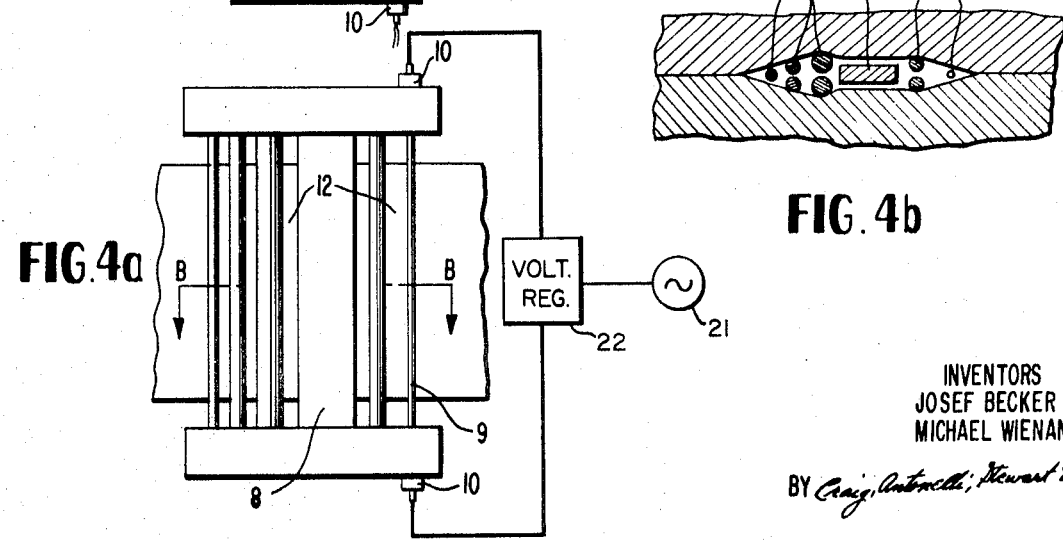

APPARATUS FOR WELDING THERMOPLASTIC SYNTHETIC FOAM BLOCKS

BACKGROUND OF THE INVENTION

In recent years, there has been great demand for large quantities of extended sheets of synthetic foam material. Often, for example, for use in upholstery fabrication, materials of this type are required in the form of extended thin sheets. For special applications, it is frequently necessary to join a plurality of blocks of synthetic foam material to form a ring.

Heretofore, when it has been necessary to join together blocks or other forms of synthetic foam material, the abutting surfaces of the blocks have been glued or cemented together. All of the known processes for accomplishing the desired adhesion by means of glue or the like, however, are unsatisfactory with respect to the finished article. The most significant deficiencies in such finished products are largely attributable to the inevitable presence of a hard seam formed at the point at which abutting surfaces have been glued together. These hard seams, which exhibit qualities of resilience substantially inferior to the major portion of the articles of foam material, are particularly troublesome insofar as further processing of the extended sheets or webs of foam material is required. Thus, if the sheets or webs formed by the cementing techniques in use heretofore are subsequently covered with thin films of pliable material, the aforementioned hard seams may be both unsightly and uncomfortable.

Prior attempts to overcome these problems, for example, by the use of conventional welding techniques, have failed. Indeed, it has been found that the particular physical characteristics of synthetic foam materials, for example, thermoplastic polymers, are such that conventional welding processes are ineffective for accomplishing the desired adhesion between abutting surfaces.

Accordingly, it is an object of the present invention to provide apparatus for effectively welding surfaces of articles of synthetic foam materials.

Further, it is an object of the present invention to provide welding apparatus for joining together abutting surfaces of articles of synthetic foam material which insures a flawless welding operation and finished product.

Further, the present invention seeks to provide apparatus for effectively welding together abutting surfaces of articles of synthetic foam material which does not result in the formation of hard seams as noted when such surfaces are joined together by the use of conventional gluing processes.

Finally, it is an object of the present invention to provide welding apparatus for the purposes mentioned hereinabove which is relatively simple and inexpensive to construct and operate.

SUMMARY OF THE INVENTION

The foregoing objects are accomplished, in accordance with the present invention, by the provision of welding apparatus including a welding device which incorporates a wedge-shaped separating member, fixed with respect to a heating wire and spaced in advance thereof, for traversing the location of the desired seam between abutting surfaces and separating these surfaces to prevent interference between the surfaces to be welded and the heating wire as the latter traverses the location of the desired seam. The separating member, or members as the case may be, are preferably supported within a common structural component, or frame, with the heating wire such that the relative disposition of the separating member and the heating wire remains constant.

The separating member, which, because of its wedge-shaped cross- sectional configuration, may be aptly denominated a separating sword, needs only to accomplish a slight separation of the abutting surfaces of the synthetic foam articles, which surfaces are compressed, by suitable clamping means, to the extent of the desired welding pressure, so that the heating wire, disposed only slightly behind the separating sword, can traverse the location of the desired seam without undue interference from these surfaces and the undesirable retardation of the free motion of the heating wire attendant to such interference.

In accordance with a further feature of the present invention, the resulting friction between the heating wire and the surfaces of the synthetic foam material to be welded may be further reduced by the provision of rollers between the separating sword and the heating wire.

An alternative embodiment of the present invention contemplates omission of the separating sword per se, the omission being compensated for by the provision of rollers disposed in advance of the heating wire. In accordance with this alternative embodiment, the rollers are arrayed such that, as a group, they form, in effect, a wedge-shaped separating means in advance of the heating wire.

A further embodiment contemplated by the present invention includes two drop-shaped members which, disposed in side-by-side relationship, define a wedge-shaped separating means. In accordance with this embodiment, these drop-shaped members are pulled through the location of the seam to be formed simultaneously and uniformly by means of flexible belts. One end of each of the flexible belts is secured to a stationary clamp while the opposite ends of both of the belts employed are connected to a common drawing device.

As will be more readily apparent from the detailed description of the drawings hereinbelow, the last-mentioned embodiment of the present invention, incorporating the flexible belts, involves a required prepositioning of the separating means, together with the belts, prior to the abutment of the surfaces to be welded and the exertion of the welding pressure thereupon. This embodiment has distinct advantages over the remaining embodiments, however, in that the use of the flexible bands for drawing the separating means through the location of the seam results in a friction-free operation. Of course, however, this advantage is obtained only at the expense of more complicated and costly apparatus.

It should be noted that the friction-free operation of the embodiment of the present invention incorporating the flexible belts is only obtained when the frictional force between a surface of a belt and a surface of an article to be welded is larger than that between adjacent surfaces of the belts. In the event that such is not the case, the separating means must be braked appropriately as it traverses through the location of the seam to be welded. This braking can suitably be accomplished, for example, by means of appropriate weights.

The pressure required for effectively welding the abutting surfaces of the two foam articles together can be produced, within the scope of the present invention, in various ways. For example, the two articles to be welded together may be clamped to two separate slide tables by means of conventional clamping devices. With the articles thus fixed relative to the respective tables, the slide tables may then be moved together until the two surfaces to be welded have been compressed against one another with the desired welding pressure exerted thereon. Of course, conveyor belts could also be employed in place of the slide tables discussed above.

BRIEF DESCRIPTION OF THE DRAWINGS

The foregoing objects, features and advantages of the present invention will become more readily apparent from a consideration of the detailed description hereinbelow, when considered in conjunction with the accompanying schematic drawings, wherein:

FIG. 1 represents a lateral view of blocks of foam material clamped to individual slide tables, illustrating the relative position of the welding device;

FIG. 2 represents a plan view of the apparatus illustrated in FIG. 1;

FIG. 3a represents a lateral view of a welding device constructed in accordance with one embodiment of the present invention;

FIG. 3b represents a sectional view along line A–A of FIG. 3a;

FIG. 4a represents a lateral view of a welding device constructed in accordance with an alternative embodiment of the present invention;

FIG. 4b represents a sectional view along line B-B of FIG. 4a;

DETAILED DESCRIPTION OF THE DRAWINGS

Figure 5:
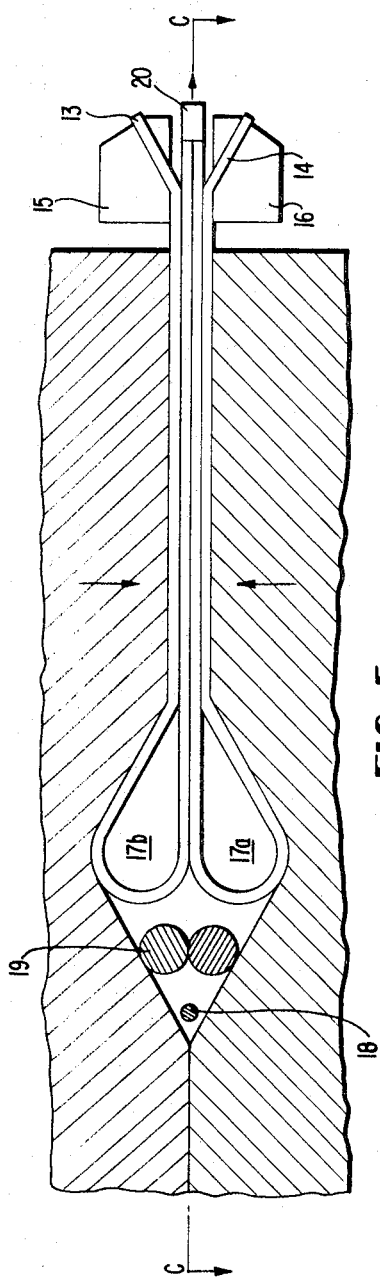
FIG. 5 represents a plan view of apparatus constructed in accordance with a further alternative embodiment of the present invention.

As seen in FIGS. 1 and 2, two blocks 1 and 2 of foam material which are to be welded together are clamped to two separate slide tables 5 and 6 by means of clamping devices 3 and 4, respectively. Thereafter, the two slide tables 5 and 6 are moved toward each other by a standard control device 7' in the direction of the arrows 7 to produce the desired welding pressure between the abutting surfaces of the two blocks 1 and 2. The tables 5 and 6 are then arrested in the desired position, so that the predetermined welding pressure between the abutting surfaces of blocks 1 and 2 is maintained. The welding pressure employed, depending upon the particular type of foam material involved, may appropriately be of a magnitude within the range of $0.002-0.02$ kp./cm.$^2$.

The welding device includes a separating sword 8 and a heating wire 9, the heating wire 9 including suitable electrical connections to provide the heat required for welding. Insulators 10 provide for heat insulation as well as for electrical separation of the heating wire 9 from the separating sword 8, disposed within a common structural component or frame with heating wire 9.

The two abutting surfaces of foam blocks 1 and 2, compressed to the extent of the desired welding pressure, are separated as the separating sword traverses the location of the seam, thus creating a small free space for passage of the heating wire 9, disposed slightly behind the separating sword 8. Heating wire 9 raises the temperature of the abutting surfaces of foam blocks 1 and 2 to the requisite welding temperature partially by radiant heat transfer and partially by means of contact and conduction. As mentioned above, the requisite welding pressure is provided by the initial compression of blocks 1 and 2. Advantageously, heating wire 9 is preheated to the welding temperature prior to insertion thereof in the location of the seam to be formed. After insertion, the electrical voltage is preferably increased to compensate for temperature decrease of heating wire 9 attributable to heat absorption by blocks 1 and 2. The voltage supply for supplying current to the heating wire 9 may include a standard voltage source 21 and a voltage regulator 22, as shown in FIG. 4a, for example.

In order to effect a further reduction in the frictional forces between separating sword 8 and the surfaces to be welded, the external surfaces of separating sword 8 may be advantageously coated with a lubricant, for example, silicone oils. A similar purpose is served by the provision of pairs of supporting rollers 11, disposed behind separating sword 8, but in advance of heating wire 9.

As illustrated in FIGS. 4a and 4b, wedge-shaped separating sword 8 can be omitted without losing the advantages thereof. This is accomplished by providing an array of supporting rollers 12 in the form of a wedge which, like wedge-shaped separating sword 8, significantly reduces the friction between the heating wire 9 and the surfaces to be welded.

Figure 5A:
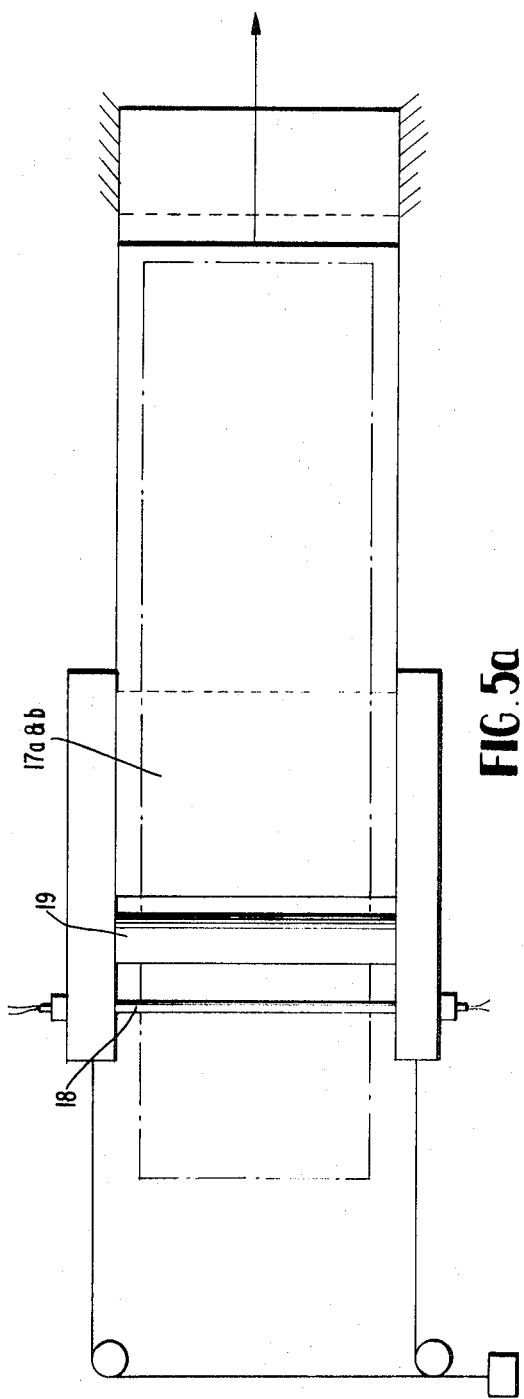
FIG. 5a represents a sectional elevation view along line C-C of FIG. 5.

A further alternative embodiment of the present invention is illustrated in FIGS. 5 and 5a. In accordance with this embodiment, a reduction of friction can be accomplished of a magnitude even greater than that obtained from the use of wedge-shaped separating sword 8 and/or rollers 11 and 12. In effect, the apparatus, as illustrated in FIGS. 5 and 5a can operate virtually friction-free. In accordance with this embodiment, flexible belts 13 and 14 are attached, at one end, to stationary clamping members 15 and 16, respectively. With one end thus secured, belts 13 and 14 are then passed through the extent of the seam to be formed, folded to enclose or to define separating sword 17, which consists of two drop-shaped parts 17a and 17b, then passed back, between themselves, through the extent of the seam to be formed, having the free ends thereof secured to a common drawing device 20. Additionally, a pair of guide rolls 19 can be provided in advance of heating wire 18. In the event that the frictional force between a surface to be welded and a surface of the belt in contact therewith is of greater magnitude than that between adjacent surfaces of the two belts 13 and 14, separating sword 17a and 17b must be appropriately braked during passage thereof through the location of the seam. This can be accomplished by the incorporation of suitable weights.

While the present invention has been disclosed with reference to certain specific embodiments thereof, it is to be understood that the scope of the invention is not limited thereto, but is susceptible of numerous changes and modifications as would be obvious to one with normal skill in the pertinent technology.

We claim:

1. Apparatus for the surface welding together of formed articles of synthetic foam material, comprising:

means for supporting the articles to be welded in abutting relationship and for exerting a compressive pressure, of a predetermined magnitude for welding, upon the abutting surfaces, welding device means adapted for traversing the location of a welded seam to be formed, including heating wire means and separating means spaced from said heating wire means in fixed position with respect thereto, said separating means being disposed in advance of said heating wire means in the direction of travel of said welding device means, and means for heating said heating wire means.

2. Apparatus according to claim 1, wherein said material is a thermoplastic polymer, said separating means having a wedge-shaped cross-sectional configuration tapering in the direction of travel of said welding device means.

3. Apparatus according to claim 2, wherein said welding device means further includes a common frame means for supporting said heating wire means and said separating means.

4. Apparatus according to claim 3, wherein said separating means includes a separating sword.

5. Apparatus according to claim 4, wherein said welding device means further includes at least one pair of guide roller means disposed between said separating means and said heating wire means in fixed positions with respect thereto.

6. Apparatus according to claim 3, wherein said separating means includes separating roller means.

7. Apparatus according to claim 6, wherein said separating means includes at least one separating roller means and at least one pair of guide roller means disposed between said separating roller means and said heating wire means in fixed positions with respect thereto.

8. Apparatus according to claim 2, further comprising a drawing device movable with respect to the articles to be welded in the direction of a welded seam to be formed, and a pair of flexible belt means, each belt having one end thereof secured to a respective stationary support member, extending through the location of the seam to be formed, being folded over upon itself to define a drop-shaped loop, and extending back through the location of the seam to be formed, wherein said two drop-shaped loop portions are disposed in side-by-side relationship and the free ends of each of said two belts are secured within said drawing device.

9. Apparatus according to claim 8, further including at least one pair of guide roller means disposed between said two drop-shaped loops and said heating wire means in fixed positions with respect thereto.

10. Apparatus according to claim 3, wherein said means for heating said heating wire means includes a source of electric power and means for regulating the voltage supply to said heating wire means.

11. Apparatus according to claim 10, further including means for thermally and electrically insulating said heating wire means from said separating means.

12. Apparatus according to claim 3, wherein said means for supporting the articles to be welded includes two relatively movable slide tables and means for controlling the relative motion thereof.

13. Apparatus according to claim 1, wherein said compressive pressure is exerted upon the entire area of the abutting surfaces.

14. Apparatus according to claim 1, wherein said separating means is disposed only in advance of said heating wire means.

15. Apparatus according to claim 3, wherein said common frame means extends beyond the width of each of the abutting surfaces to be welded.